A. A. MARCELLUS.
Potato-Digger.
No. 13,822. Patented Nov. 20. 1855.
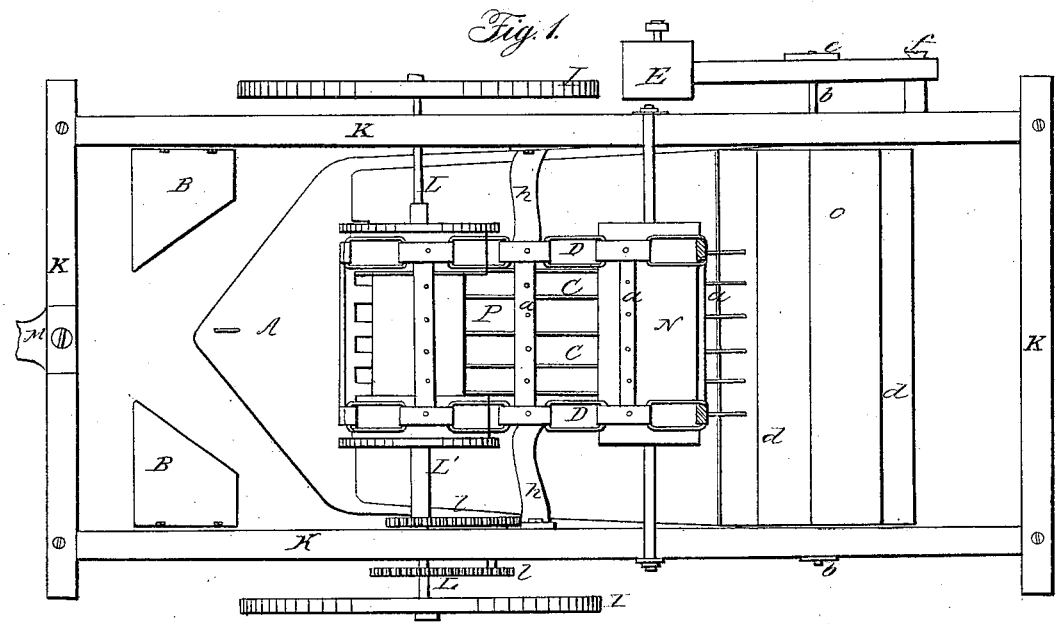
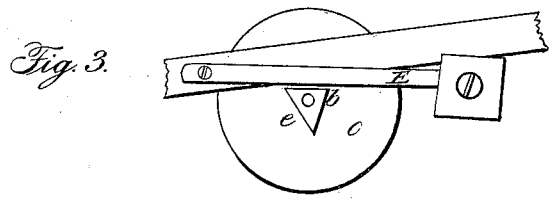
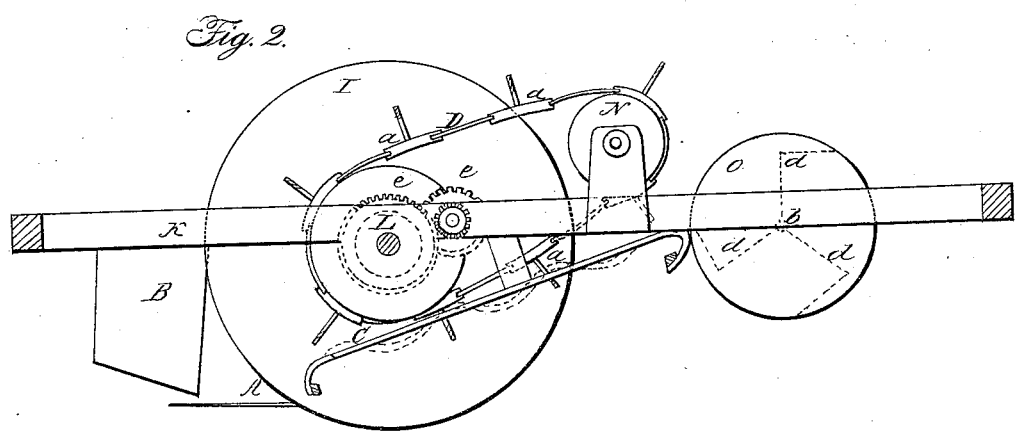

UNITED STATES PATENT OFFICE.

A. A. MARCELLUS, OF NEW YORK, N. Y.

IMPROVEMENT IN POTATO-DIGGERS.

Specification forming part of Letters Patent No. 13,822, dated November 20, 1855.

*To all whom it may concern:*

Be it known that I, A. A. MARCELLUS, of the city, county, and State of New York, have invented a new and useful Improvement in Potato-Diggers; and I do hereby declare that the following is a full, clear, and exact description thereof, reference being had to the accompanying drawings, forming a part of this specification.

Figure 1 is a top view; Fig. 2, a side elevation and central section; Fig. 3, a section exhibiting the cam and weighted lever.

The nature of my invention consists in so constructing an implement for harvesting potatoes that they can be effectually removed from the earth and delivered in heaps without injury to the tubers, and with the insurance of careful gleaning. This I effect by means of a suitable plow and wings, revolving series of rakes, &c., constructed as follows, viz:

K K K K represent a quadrangular frame, supported on a pair of wheels, I I. L is the axle thereof. The propulsion of this track or carriage is by a pole or tongue, M.

A is a broad share, performing the office of a plow; B B, side wings or shares, acting as mold-boards in removing the soil from the row of tubers. They are firmly bolted and secured to the framing K K.

C is a separator, composed of rods united by a cross-bar at front and rear, so placed as to be out of the way of the rakers. These rods are so bent as to form an undulating surface to break up the earth more perfectly, as shown in the dotted line of Fig. 2.

D D are endless chains passing over a roller on axle L, and over a second one, N.

*a a a* are rake-heads furnished with metal teeth, and with the view of preventing injury to the potatoes they are covered with gutta-percha. These teeth pass between the rods of the separator, and carry up the tubers thereon, delivering them into a suitable receiver, O. This consists of a pair of heads mounted on an axle, *b b*. Between these heads are three division-boards, thus forming boxes. The receiver O is situated at the rear of the separator. The receiver O is kept in position until loaded by means of a triangular cam, *e*, secured on the axle *b*, upon which rests the weighted lever E.

*f* is the fulcrum of lever E.

The delivery of the potatoes from the compartment of the receiver is effected by the preponderance of their weight overcoming that of the lever, and the effect is that of discharging them in heaps on the ground. The separator C is suspended from the frame K K by a pair of arms, *h h*, and has a slight vibratory motion allowed it by the ends of the rakes striking the cross-bar of the separator.

It will be noticed that the drum or pulley P, on which the endless chain revolves, is provided with a sleeve, L′, so as to allow of an accelerated motion being given it by suitable gearing, *l l*, connected with the main shaft or axle L.

The operation is as follows: The wings B B having scraped the soil, the plow A enters below the potatoes and brings them on its broad share, when the teeth of the revolving rakes *a a* draw them up the separator and deliver into the receiver O, from whence they fall to the earth, as before described, in suitable heaps.

Having described my improvement, I claim—

In combination with the revolving rakes, the undulating-surfaced separator C, and receiver O, when arranged in the manner and for the purposes set forth in the foregoing specification.

In testimony whereof I have hereunto signed my name before two subscribing witnesses.

A. A. MARCELLUS.

Witnesses:
WM. S. CLARK,
JOHN S. HOLLINGSHEAD.